United States Patent [19]

Mattedi et al.

[11] 3,906,453

[45] Sept. 16, 1975

[54] CARE MEMORY CONTROL CIRCUIT

[75] Inventors: Bruno A. Mattedi, Villa Park; Jitendra G. Nemivant, Skokie, both of Ill.

[73] Assignee: Victor Comptometer Corporation, Chicago, Ill.

[22] Filed: Mar. 27, 1974

[21] Appl. No.: 455,417

[52] U.S. Cl. ........................................ 340/172.5

[51] Int. Cl.[2] ........................................ G06F 13/06

[58] Field of Search ........................ 340/172.5, 173

[56] References Cited

UNITED STATES PATENTS

| | | | |
|---|---|---|---|
| 3,054,988 | 9/1962 | Edwards et al. | 340/172.5 |
| 3,229,255 | 1/1966 | Anderson | 340/172.5 |
| 3,237,169 | 2/1966 | Hartwig et al. | 340/172.5 |
| 3,404,375 | 10/1968 | Snyder | 340/172.5 |
| 3,426,328 | 2/1969 | Gunderson et al. | 340/172.5 |
| 3,560,942 | 2/1971 | Enright, Jr. | 340/173 |
| 3,564,517 | 2/1971 | McLean et al. | 340/172.5 |
| 3,597,747 | 2/1966 | Winkler et al. | 340/172.5 |
| 3,731,285 | 5/1973 | Bell | 340/172.5 |

*Primary Examiner*—Gareth D. Shaw
*Assistant Examiner*—John P. Vandenburg
*Attorney, Agent, or Firm*—McCaleb, Lucas & Brugman

[57] ABSTRACT

An interchangeable memory system includes a novel core memory control circuit for rendering a non-volatile magnetic core random access memory having a two-part memory cycle, for sequential reading and writing operations, interchangeable with a simultaneously read and written volatile semiconductor random access memory in a known semiconductor digital data processing system having a time-shared address bus and a time-shared instruction and data bus, the address bus being operable to access program read-only memory and data random access memory locations at alternate time intervals, and the instruction and data bus being operable to alternately carry read-only memory instruction signals and bi-directional random access memory data signals, the latter signals for simultaneous semiconductor random access memory reading and writing operations. The core memory control circuit enables compatible substitution of the sequentially read and written magnetic core random access memory for the simultaneously read and written semiconductor random access memory in the data processing system without circuit modifications to the latter.

7 Claims, 5 Drawing Figures

CARE MEMORY CONTROL CIRCUIT

BACKGROUND OF THE INVENTION

1. Field of the Invention

This invention relates generally to electronic digital data processing systems and, more particularly, to an interchangeable memory system having a novel core memory control circuit for use therein.

2. Description of the Prior Art

Electronic digital data processing systems have been provided for particular use in relatively small applications, such as electronic business machines including cash registers. Such a system typically includes a digital data processor, frequently called a "microprocessor," connected to a read-only memory (ROM) for storing program instructions, a randon access memory (RAM) for storing working or variable transaction data, and input-output (I/O) devices for entering numeric and functional data into the system and for displaying and printing its output data. The microprocessor and memory units frequently comprise metal oxide semiconductor (MOS) large-scale integrated circuits.

However, such a semiconductor RAM used in such a device is volatile; that is, loss pf power to the device results in a complete loss of stored data. In an electronic business machine such as a cash register, power failure can result in a serious loss of valuable stored data representing confidential department, clerk and sales totals. For this reason, an auxiliary battery power supply is typically required to allow continued operation following a power failure to recover data in an emergency read-out operation within a predetermined time interval. However, complete data loss nevertheless occurs after that predetermined time has elapsed.

An alternative to the use of a semiconductor RAM is the substitution of a non-volatile magnetic core RAM in its place. As those familiar with semiconductor data processing systems will readily appreciate, for reasons of efficiency and economy, microprocessors may be connected to a time-shared address bus and a time-shared instruction and data bus, the address bus being operable to access program ROM and data RAM locations at alternate time invervals, and the instruction and data bus being operable to alternately carry ROM instruction signals and bi-directional RAM data signals, the latter signals for simultaneous semiconductor RAM reading and writing operations. Since the reading and writing operations in a magnetic core RAM require multiple steps during sequential time intervals, as opposed to the simultaneous reading and writing operations in a semiconductor RAM, a magnetic core RAM is not readily adaptable for use in a semiconductor data processing system having time-shared address, and instruction and data, buses designed for use with a semiconductor RAM.

SUMMARY OF THE INVENTION

The present invention is directed toward novel core memory control circuit means for rendering a non-volatile magnetic core RAM having a two-part memory cycle, for sequential reading and writing operations, interchangeable with a simultaneously read and written volatile semiconductor RAM in a known data processing system having a time-shared address bus and a time-shared instruction and data bus, the address bus being operable to access program ROM and data RAM locations at alternate time intervals, and the instruction and data bus being operable to alternately carry ROM instruction signals and bidirectional RAM data signals for simultaneous semiconductor RAM reading and writing operations. The core memory control circuit means of the present invention enables compatible substitution of the sequentially read and written magnetic core RAM for the simultaneously read and written semiconductor RAM in the data processing system without circuit modifications to the latter. For use in electronic business machines such as cash registers, purchasers can alternatively select, depending upon their particular requirements, machine units having either volatile semiconductor RAMs with battery back-up power supplies, or optional magnetic core RAMs with associated core memory control circuits, the machines being identical in all other respects. In the preferred working embodiment of the present invention, the substitution or interchangeability of the semiconductor and magnetic core RAMs is a very simple installation matter.

More specifically, the present invention comprises core memory control circuit means in combination with a known electronic digital data processing system having central processing means for obtaining and executing program instruction signals from an addressable program ROM, and for retrieving variable transaction output data signals from, and simultaneously entering variable transaction input data signals into, an addressable volatile semiconductor RAM, time-shared address bus means for receiving address signals from the processing means to sequentially and repetitively access preselected address locations in the ROM and the RAM during first and second intersticed time intervals, respectively, time-shared instruction and data bus means connected to the processing means and operable to obtain the instruction signals during the second time intervals, and to retrieve the output data signals and enter the input data signals during the first time intervals, both the address bus means and the instruction and data bus means being cleared of signals during the time intervals between the first and second time intervals, and write command means connecting the processing means with the RAM for providing write command signals to the latter to enter the input data signals therein during certain of the first time intervals in accordance with the ROM instruction signals.

The core memory control circuit means of the present invention compatibly connects the address bus means, the instruction and data bus means and the write command means of the data processing system with a known non-volatile magnetic core RAM having repetitive memory cycles each initiated after a second time interval and comprising first and second parts, output data signals being retrieved from the core memory during the first parts and input data signals being entered into the core memory during the second parts. The core memory control circuit means comprises: memory cycle timing signal means for repetitively initiating each memory cycle and sequentially determining the first and second parts thereof; core memory write signal means for controlling the core memory to enter the input data signals therein during certain of the second parts in response to the write command signals provided by the write command means; address latching means for stabilizing prior to each first part of a memory cycle the random access memory address signals received from the address bus means during the second time interval next preceding said first part; data latching means for stabilizing prior to each second part said input data signals received from the instruction and data bus means during the first time interval next preceding said second part; and data output means for presenting at the output thereof the output data signals retrieved from the core memory to the instruction and data bus means during each first time interval, and for floating the output of the data output means during each second time interval. The core memory control circuit means thereby renders the sequentially read and written magnetic random access memory interchangeable with the simultaneously read and written semiconductor random access memory.

DESCRIPTION OF THE PREFERRED EMBODIMENT

Figure 1:
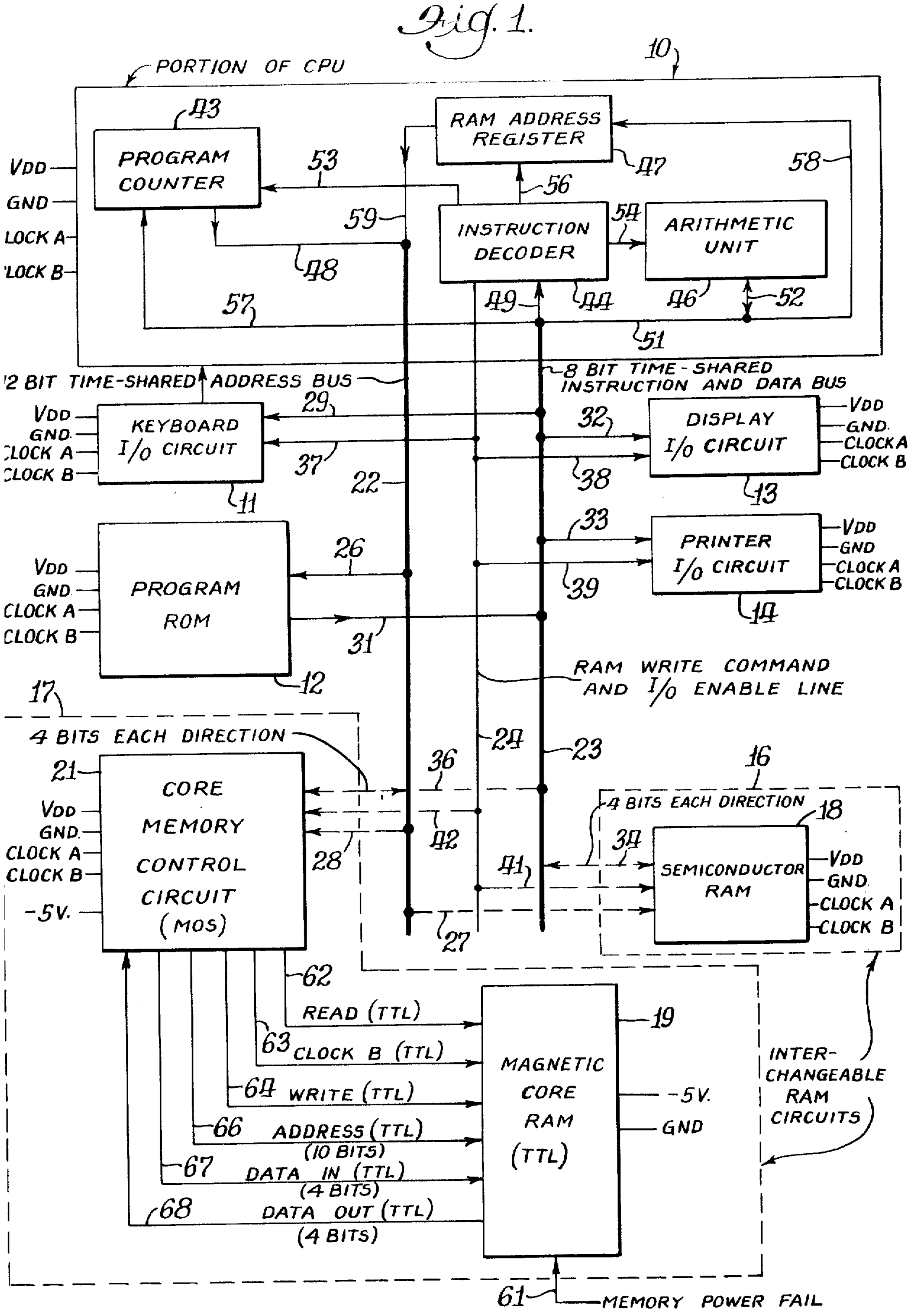
FIG. 1 is a simplified block diagram illustrating the basic features of the interchangeable memory system adapted for use in an electronic business machine, and showing the circuit connections to the core memory control circuit means of the present invention.

Turning now to the preferred embodiment of the present invention, as shown in FIG. 1, a known electronic digital data processing system comprising metal oxide semiconductor (MOS) integrated circuit chips and adapted for use in an electronic business machine, such as a cash register, includes a central procesing unit (CPU) 10 or central digital data processing means, some of the essential features of which are illustrated in the large enclosed box in the upper portion of that figure. A keyboard means comprising a known keyboard and an associated keyboard input-output (I/O) or buffer circuit 11 is provided for producing numeric and functional data signals in response to actuation of a plurality of manually operable keys (not shown). A known program read-only memory (ROM) 12 is provided for storing addressable program instructions. A display means comprising a display (not shown) and an associated display I/O circuit 13 is included for visually displaying characters indicating transaction data. A printing means comprising a printer (not shown) and an associated printer I/O circuit 14 is also provided for producing printed documents of both business transaction information and summaries of transaction data. Interchangeable RAM circuits 16 and 17, illustrated within the dotted boxes at the lower portion of FIG. 1, are each operable to store addressable working or variable transaction data. RAM circuit 16 contains a known volatile non-destructively read MOS RAM 18; and RAM circuit 17 contains a known non-volatile magnetic core RAM 19, and the core memory control circuit means 21 of the present invention. RAM circuits 16 or 17 are interchangeably provided for connection to the digital data processing system.

The CPU 10 of the known data processing system, called a "parallel processing system," is designed to obtain and execute program instruction signals from the program ROM 12, and in a parallel manner is operable to retrieve variable transaction output data signals from, and simultaneously enter variable transaction input data signals into, the semiconductor RAM 18. In order to perform these functions, a twelve bit or line time-shared or multiplexed address bus means 22 is provided for receiving address signals from the CPU 10 to sequentially and repetitively access preselected address locations in the progam ROM 12 and the semiconductor RAM 18 during first and second intersticed time intervals, respectively, in a manner to be described in detail later. In addition, an eight bit or line time-shared instruction and data bus means 23 is connected to the CPU 10 and is operable to obtain the instruction signals from the program ROM 12 during the second time intervals, and to retrieve output data signals from semiconductor RAM 18 and enter input data signals into the semiconductor RAM during the first time intervals; the instruction and data bus 23 being an eight bit instruction bus when operatively connected to the program ROM 12, and a four bit data bus in each of two directions when operatively connecting the CPU 10 to the I/O circuits and the semiconductor RAM (that is, to and from that RAM for simultaneous reading and writing operations). A write command means comprising RAM write command and I/O enable line 24 connects the CPU 10 with the semiconductor RAM 18 for providing write command signals to the latter to enter input data signals therein during certain of the first time intervals in accordance with the instruction signals from the program ROM 12; in addition, the RAM write command and I/O enable line 24 is operable to provide an I/O selection signal to determine the selection of I/O circuits by the CPU instead of the semiconductor RAM for interchange of data during certain of the previously mentioned first time intervals.

Because the eight bit instruction and data bus 23 functions as a dual four bit bi-directional data bus when operatively connected to the semiconductor RAM 18, it is possible for the semiconductor RAM to read four bits from its accessed address location out to that bus and simultaneously write four bits from that bus into its accessed address location. The magnetic core RAM 19, however, cannot be simultaneously read and written; a magnetic core RAM typically has repetitive memory cycle each comprising first and second sequential parts, output data signals being retrieved from the core memory during the first part and input data signals being entered into the core memory during the second part. The core memory control circuit 21 of the present invention renders the sequentially read and written magnetic core RAM 19 compatible with the previously described known semiconductor data processing system having time-shared buses designed for use with the simultaneously read and written semiconductor RAM 18, thereby enabling interchangeability of RAM circuits 16 and 17.

As shown in FIG. 1, the address bus 22 is connected to the program ROM 12 through lines 26, and to either the semiconductor RAM 18 or to the core memory control circuit 21 through lines 27 or 28, respectively, the lines being shown dotted to signify optional connections. The instruction and data bus 23 is connected to the keyboard I/O circuit 11, the program ROM 12, the display I/O circuit 13 and the printer I/O circuit 14 by means of lines 29, 31, 32 and 33, respectively. The instruction and data bus 23 is optionally connected to either the semiconductor RAM 18 or the core memory control circuit 21 by means of eight bit lines 34 or 36, respectively, these lines each comprising four bits in each direction for both reading and writing operations. The RAM write command and I/O enable line 24 is connected to the keyboard I/O circuit 11, the display I/O circuit 13 and the printer I/O circuit 14 through lines 37, 38 and 39, respectively; and the RAM write command and I/O enable line is also connected to either the semiconductor RAM 18 or the core memory control circuit 21 through lines 41 or 42, respectively. The output of the keyboard I/O circuit 11 is connected directly to the CPU 10 in a known manner.

The CPU 10 is a known digital processing device having a program counter 43 for creating and storing addresses for the program ROM 12; an instruction decoder 44 for controlling all CPU registers to execute the program ROM instructions; an arithmetic unit 46 having an accumulator, a binary adder and working registers for performing arithmetic and logic operations; a RAM address register 47 for storing next RAM address locations; and multiplex receivers and drivers (not illustrated) for connecting the CPU 10 with the address bus 22, the instruction and data bus 23, and the RAM write command and I/O enable line 24.

The design and operational details of the CPU 10 are well-known in the electronic computer art, and form no part of the present invention. Briefly, however, in the operation of the CPU 10, the program counter 43 is sequentially decremented or otherwise controlled to create and store address locations for the program ROM 12, the program counter being connected to address bus 22 by means of lines 48. In response to the selection of a single address location, represented by an energization pattern of the 12 bit or lines of the address bus 22, the program ROM 12 produces at its output on lines 31 to the instruction and data bus 23 a corresponding instruction represented by the energization pattern of the eight bits or lines of the instruction and data bus. The addressed instruction is received by the CPU 10 and supplied to the instruction decoder 44 through lines 49, and to the arithmetic unit 46 through lines 51 and bi-directional lines 52. The instruction decoder 44 contains logic circuits for decoding each ROM instruction, and provides control signals on lines 53, 54 and 56, respectively connected to the program counter 43, the arithmetic unit 46 and the RAM address register 47, to execute each instruction for performing data transfers, arithmetic operations and logical sequences in a well-known manner. Lines 57 connect the instruction and data bus 23 to the program counter 43 to operatively control the latter to select ROM address locations during branching operations. Lines 58 are provided for connecting the instruction and data bus 23 to the RAM address register 47.

The RAM address register 47, connected to the address bus 22 through lines 59, stores the next RAM address location to be accessed; and after the addressing of the program ROM 12, the RAM address register supplies the next address location to the address bus 22 through lines 59.

The CPU 10, the keyboard I/O circuit 11, the program ROM 12, the display I/O circuit 13, the printer I/O circuit 14 and the semiconductor RAM 18 comprise metal oxide semiconductor (MOS) intergrated circuit chips, and are provided with suitable typical MOS level power inputs designated in FIG. 1 by $V_{DD}$ (−17 volts) and GND (0 volts or ground potential). These chips are also controlled for time-shared operation of the address bus 22 and the instruction and data bus 23 by means of first and second synchronized and phased clock signals designated CLOCK A and CLOCK B, respectively, the second signal (CLOCK B) being of twice the frequency of the first signal. As pictorially illustrated in FIGS. 2(*a*) and (*b*), the CLOCK A and CLOCK B signals vary from 0 volts to −17 volts; electronic gating circuits being provided in each of the previously mentioned integrated circuit chips to be responsive to voltage transitions of these signals in a known manner to effect time-shared operation of the address bus 22 and the instruction and data bus 23.

The magnetic core RAM 19 suitable for use with the preferred embodiment of the core memory control circuit 21 of the present invention comprises transistor-transistor logic (TTL) circuits, or logic circuits utilizing transistors, which operate at suitable TTL voltage levels of ground and −5 volts. Of course, the operation of the core memory control circuit 21 is not limited to the disclosed voltage levels, their selection being merely a matter of design choice; conventional voltage level shifters being available to accommodate devices operating at different voltage levels. As shown in FIG. 1, the magnetic core RAM 19 is also connected to a memory fail signal on line 61 provided by the CPU 10 to effect orderly start-up and shut-down of the magnetic core RAM upon application and removal of core power in a known manner; the memory power fail signal preventing further acceptance of commands and output of data in response to abnormal power supply conditions.

The core memory control circuit 21 is connected to the magnetic core RAM 19 to provide to the latter the following signals at TTL voltage levels designated within the dotted box enclosing the interchangeable core RAM circuit 17 in FIG. 1 as follows: READ (TTL) on line 62, CLOCK B (TTL) on line 63, WRITE (TTL) on line 64, ADDRESS (TTL) on ten bit lines 66, and DATA IN (TTL) on four bit lines 67. DATA OUT (TTL) signals on four bit lines 68 are provided from the magnetic core RAM 19 to the core memory control circuit 21. In the preferred embodiment of the present invention, the core memory control circuit 21 comprises MOS integrated circuits having $V_{DD}$, GND, −5 volts, CLOCK A and CLOCK B connections. As will be described in detail, the core memory control circuit 21 provides signals to core RAM 19 on lines 62, 63, 64, 66 and 67; the core memory control circuit receives output data signals from the core RAM on lines 68 which are presented to the instruction and data bus 23 at appropriate voltage levels and time intervals.

Figure 2:
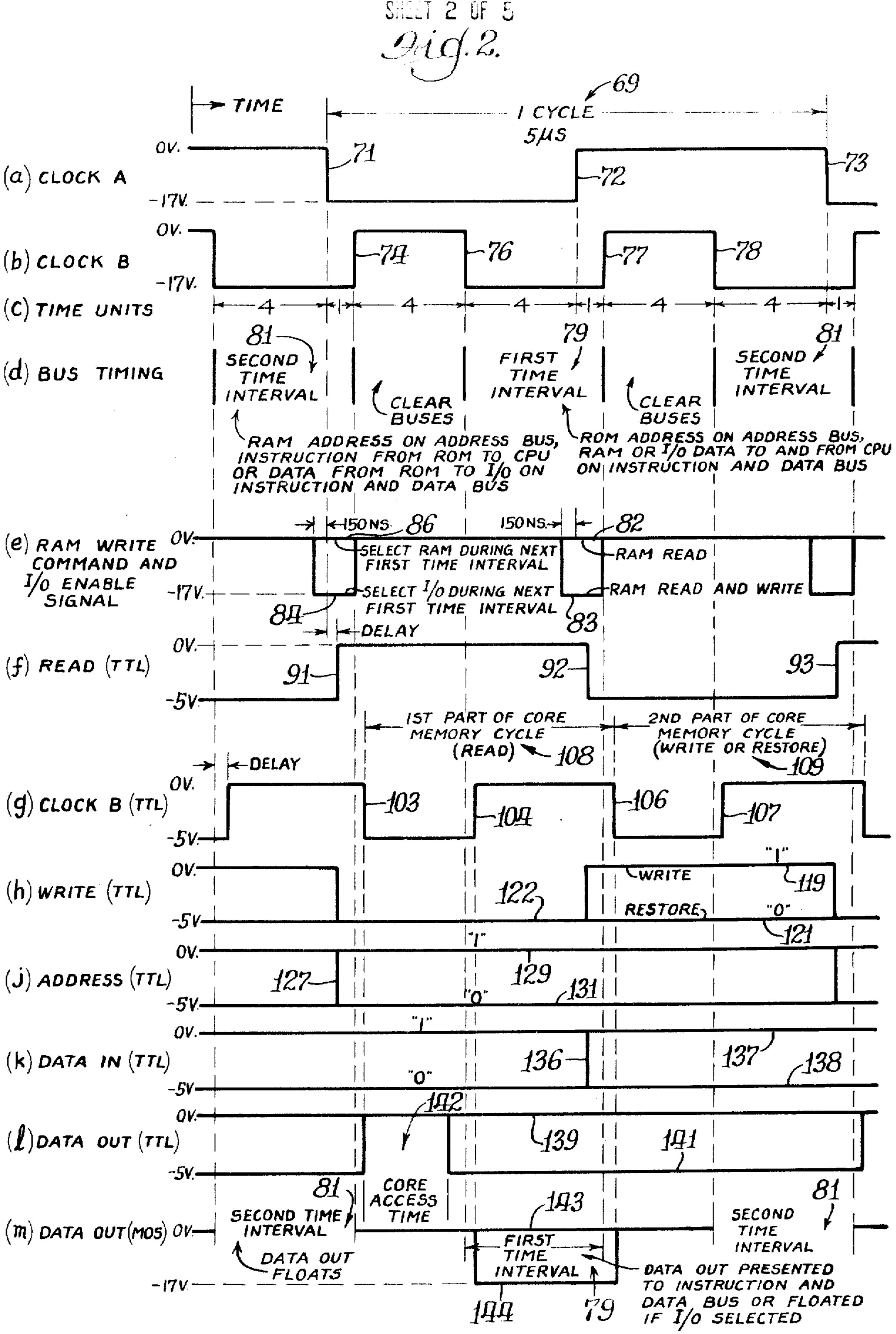
FIG. 2 is a pictorial representation of voltage levels with respect to time of certain signals appearing within the circuit illustrated in FIG. 1.

With reference to FIGS. 2(*a*) and (*b*), the CLOCK A and CLOCK B signals supplied to the MOS integrated circuit chips each comprise free-running or continuously repetitive pulses having high and low states of 0 volts or ground, and −17 volts or $V_{DD}$, respectively. The digital data processing system has a timing cycle, designated by reference numeral 69, having a duration of approximately 5 microseconds beginning with the first high to low transition of the CLOCK A signal designated by reference numeral 71 in FIG. 2(*a*), continuing through the low to high transition 72 at the mid-point of the cycle, and ending with the next high to low transistion 73. As shown in FIG. 2(*b*), the CLOCK B signal is of twice the frequency of the CLOCK A signal, and is phased to assume a low to high transistion 74 after a time delay has occurred following the high to low transition 71 of CLOCK A, the time delay comprising one time unit out of a total of eighteen time units for the entire cycle 69, as illustrated in FIG. 2(*c*). The CLOCK B signal remains high for four time units and then decreases to −17 volts, as indicated by numeral 76. The CLOCK B signal then continues for five time units and assumes a low to high transition 77 after one time unit has elapsed following the low to high transition 72 of CLOCK A. Again, after four more time units, the CLOCK B signal decreases to −17 volts, as designated by numeral 78. The CLOCK A and CLOCK B signals repetitively continue as long as the data processing system is in operation.

The timing cycle 69 of the known data processing system is divided into distinct periods or phases, as diagrammatically illustrated in FIG. 2(*d*), during which the address bus 22, the instruction and data bus 23, and the RAM write command and I/O enable line 24 operate in a predetermined manner. Each timing cycle 69 comprises first and second intersticed time intervals illustrated by reference numerals 79 and 81, respectively, which are repeated in accordance with the free-running operation of the CLOCK A and CLOCK B signals, two of the second time intervals 81 and one of the first time intervals 79 being shown in FIG. 2(*d*).

With additional reference to FIG. 1, the time-shared address bus 22 is operable to receive address signals from the program counter 43 (by way of lines 48) and the RAM address register 47 (by way of lines 59) of the CPU 10 to sequentially and repetitively access preselected address locations in the program ROM 12 and the semiconductor RAM 18 during the first time interval 79 and the second time interval 81, respectively, of each cycle 69, as shown in FIG. 2(*d*). During each first time interval 79, the address bus 22 carries the selected program ROM address; and during each second time interval, the address bus carries the selected RAM address. The time-shared instruction and data bus 23 is operable to obtain instruction signals from the program ROM 12 during the second time intervals 81, and to retrieve output data signals from the RAM and to enter input data signals into the RAM during the first time intervals 79. Both the address bus 22 and the instruction and data bus 23 are cleared of signals during the time intervals between the first and second intersticed time intervals 79 and 81.

The RAM write command and I/O enable line 24 of the known data processing system is controlled by the instruction decoder 44 of the CPU 10 to provide write command signals to the semiconductor RAM 18 to enter input data signals into the latter during certain of the first time intervals 79 in accordance with the instructions received from the program ROM 12. As shown in FIG. 2(*e*), during each first time interval 79, and commencing 150 nanoseconds prior to the low to high transition 72 of the CLOCK A signal, the RAM write command and I/O enable line 24 can assume two voltages conditions: 0 volts, as indicated by numeral 82, corresponding to only a reading operation of the semiconductor RAM 18; and −17 volts, indicated by numeral 83, commanding both reading and writing operations of the MOS RAM. In addition to the foregoing, as noted earlier, the CPU 10 is operable to select I/O circuits instead of the semiconductor RAM 18 for interchange of data signals between the CPU and the selected I/O circuit by means of the instruction and data bus 23 during certain of the first time intervals 79, the RAM write command and I/O enable line being operable to provide an I/O selection signal during the second time interval 81 next preceding the first time interval 79 during which the CPU is to communicate with the selected I/O circuit. For this I/O selection, the RAM write command and I/O enable line 24 assumes a voltage of −17 volts, as indicated by numeral 84 in FIG. 2(*e*), beginning 150 nanoseconds prior to the high to low transition 71 of the CLOCK A signal and continuing until termination of the second time interval 81. For selection of the semiconductor RAM 18 during the next first time interval 79, the RAM write command and I/O enable line is a 0 volts, as indicated by numeral 86 in FIG. 2(*e*). During each second time interval 81 next preceding a first time interval 79 during which the CPU 10 is to communicate with an I/O circuit, the instruction and data bus 23 carries data from the program ROM 12 to all of the I/O circuits for selecting a particular I/O circuit, and for giving the selected I/O circuit an operational command to be executed, as illustrated in FIG. 2(*d*).

The magnetic core RAM 19 suitable for use with the core memory control circuit 21 of the present invention comprises a known non-volatile magnetic core memory such as, but not limited to, a four-wire destructively read device having repetitive memory cycles each comprising first and second parts, output data signals being retrieved from the core memory during the first part and input data signals being entered into the core memory during the second part. The details of the magnetic core memory 19 utilized with the preferred emobodiment of the present invention will be subsequently described.

FIGS. 2(*f*)-(*k*) illustrate pictorially the signals supplied to the core RAM 19 by the core memory control circuit 21, these signals appearing on lines 62, 63, 64, 66 and 67, respectively, the (TTL) suffixes designating TTL voltage levels for such signals. FIG. 2(*l*) illustrates the DATA OUT(TTL) signals on lines 68 supplied from the magnetic core RAM 19 to the core memory control circuit 21. The DATA OUT (MOS) signals provided from the core memory control circuit 21 to the instruction and data bus 23 by means of four bits of lines 36 are illustrated in FIG. 2(*m*), the (MOS) suffix signifying MOS voltage levels.

Figure 3:
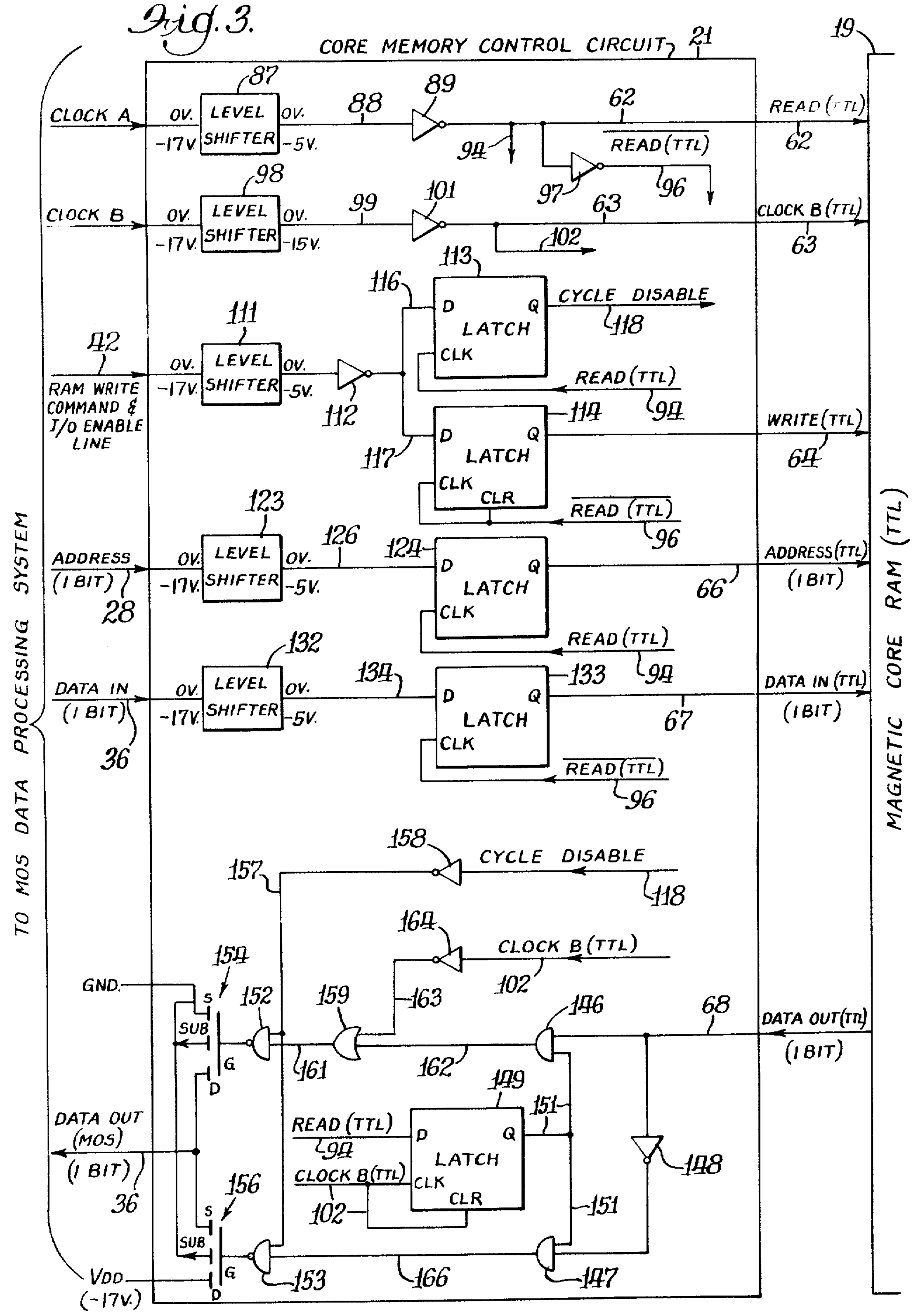
FIG. 3 is a simplified schematic diagram showing the basic features of the core memory control circuit means of the present invention.

With additional reference to FIG. 3, which illustrates the basic features of the core memory control circuit 21 of the present invention, the latter comprises memory cycle timing signal means for repetitively initiating each memory cycle of the magnetic core RAM 19 after each of the second time intervals 81 shown in FIG. 2(*d*), and for sequentially determining the first and second parts of each memory cycle. The CLOCK A signal supplied to the core memory control circuit 21 is connected to a known level shifter 87 operable to shift or transform the −17 volt MOS pulse signals to −5 volt TTL pulse signals, the corresponding voltage levels at the input and output terminals of the level shifter being designated in FIG. 3. The level shifter is connected by means of a line 88 and an inverter 89 to line 62 which, as noted earlier, is connected to the magnetic core RAM 19. The READ(TTL) signal, as shown in FIG. 2(*f*), is the inverse of the CLOCK A signal at TTL levels and delayed by a slight circuit propagation time delay, such a delay being insignificant to proper circuit operation. Corresponding to the timing cycle 69, the READ(TTL) signal assumes a low to high transition indicated at 91, a high to low transition 92, and another low to high transition 93, as shown in FIG. 2(*f*). Line 62 (FIG. 3) is additionally connected to an internal interconnecting line 94, and another interconnecting line 96 through an inverter 97 to produce a $\overline{\text{READ(TTL)}}$ signal, the latter being the inverse of the READ(TTL) signal, which is utilized elsewhere in the core memory control circuit 21 in a manner to be described.

As also shown in FIG. 3, the CLOCK B signal is connected through a level shifter 98 (similar to level shifter 87), which in turn is connected to line 63 through a line 99 and an inverter 101, line 63 being connected to an internal interconnecting line 102. With reference to FIG. 2(*g*), the CLOCK B(TTL) signal is the inverse of the CLOCK B signal but shifted to TTL voltage levels and delayed slightly by an insignificant circuit propagation delay. The CLOCK B(TTL) signal assumes a high to low transition 103 following the low to high transition 91 of the READ(TTL) signal, and a low to high transition 104, both during the first part of the magnetic core memory cycle. The CLOCK B(TTL) signal incurs a high to low transition 106 following the high to low transition 92 of the READ(TTL) signal, and a low to high transition 107, both during the second part of the magnetic core memory cycle. While the READ(TTL) signal is operable to determine the first and second parts of the core memory cycle, the high to low transitions 103 and 106 are conveniently available to sequentially determine the precise time of commencement of the first part 108 and the second part 109 of the magnetic core memory cycle. As will be described in detail later, the memory cycle timing signal means of the core memory control circuit 21 provides signals derived from the CLOCK A and CLOCK B signals to control two monostable multivibrators to provide timing pulse signals at the beginning of each of the first and second parts 108 and 109 of the magnetic core memory cycle. Reading operations of the core RAM 19 occur during the first parts 108 of the core memory cycles; writing operations, or restoration of destructively read data, occur during the second parts 109 of the core memory cycles.

The core memory control circuit 21 further comprises core memory write signal means for controlling the core memory 19 to enter input data signals therein during certain of the second parts 109 of the core memory cycles in response to write command signals produced by the RAM write command and I/O enable line 24. As shown in FIG. 3, the RAM write command and I/O enable line 24 is connected by means of line 42 to a level shifter 111 (similar to the previously described level shifters), the output thereof being connected through an inverter 112 to the data (D) terminals of first and second conventional electronic latching means or bistable multivibrators 113 and 114 through lines 116 and 117, respectively. The clock (CLK) input terminal of latch 113 is connected to the READ(TTL) interconnecting line 94; and the clock and clear (CLR) terminals of latch 114 are connected to the $\overline{\text{READ(TTL)}}$ interconnecting line 96. The output (Q) terminal of the latch 113 is connected to a memory cycle disable line 118 for providing "1" logic state or O volt memory cycle disable signals in response to the –17 volt I/O selection signals designated by numeral 84 in FIG. 2(*e*) when the CPU 10 selects I/O circuits instead of the connected RAM. The utilization of the memory cycle disable signals will be described later. The output terminal of the second latch 114 is connected to line 64 for providing to the core RAM 19 the core memory write signals pictorially represented in FIG. 2(*h*), a 0 volt signal condition (corresponding to a "1" logic state), designated by numeral 119, being operable to control the core memory for writing operations during the second part 109 of the core memory cycle, a –5 volt signal condition (corresponding to a "O" logic state), designated by numeral 121, being operable to control the core memory to restore (during the second part) the data destructively read during the first part 108 of the memory cycle, both signals being operable to control the core memory in a manner to be subsequently described. The WRITE(TTL) signal is at a low condition designated by numeral 122 in FIG. 2(*h*) during the first part 108 of each core memory cycle.

In order to provide the previously mentioned 1 logic state memory cycle disable signals on line 118, latch 113 is operable in a known manner to latch or maintain at its output (connected to line 118) the signals appearing at its input (connected to line 116) in response to positive-going or low to high transitions on its clock terminal (connected to line 94). When the RAM write command and I/O enable signal is at –17 volts during a second time interval 81, as indicated by numeral 84 in FIG. 2(*e*), the data terminal of latch 113 assumes 0 voltage (a 1 condition), as a result of the operation of the inverter 112 connected to line 116, this condition being latched by the low to high transition 91 of the READ(TTL) signal on line 94 prior to the first part 108 of the magnetic core memory cycle, as shown in FIG. 2(*f*). The cycle disable line 118 remains at 0 volts until the READ(TTL) signal assumes another low to high transition, at which time latch 113 is again triggered as just described.

Latch 114 is controlled by the $\overline{\text{READ(TTL)}}$ signal at its clear terminal (connected to line 96), this signal being at –5 volts or logic state 0 for the first part 108 of the core memory cycle due to the operation of inverter 97, the $\overline{\text{READ(TTL)}}$ signal assuming a low to high transition simultaneously with the high to low transition 92 of the READ(TTL) signal, which is illustrated in FIG. 2(*f*). When the clear terminal of latch 114 is at logic state 0 during the first part 108 of the core memory cycle, the WRITE(TTL) signal output of latch 114 on line 64 is also at a 0 logic state or condition, the 0 logic state on the clear terminal serving to prevent the output of latch 114 from assuming a 1 logic state. The clear terminal of latch 114 assumes a logic 1 condition during the second part 109 of the core memory cycle, thereby enabling positive-going transitions of the $\overline{\text{READ(TTL)}}$ signal, also connected to the clock terminal of the latch, to control the latch to provide at its output (connected to line 64) during the second part 109 of the magnetic core memory cycle a 1 logic state, illustrated by numeral 119 in FIG. 2(*h*), in response to a –17 volt condition of the RAM write command and I/O enable line 24 during the first time interval 79 next preceding the second part 109 of the core memory cycle, this –17 volt condition being illustrated by numeral 83 in FIG. 2(*e*). Conversely, latch 114 provides at its output a –5 volt condition or logic state 0 during the second part 109 of each memory cycle in response to a 0 volt condition on the RAM write command and I/O enable line 24 during the next preceding first time interval 79, this 0 volt condition being illustrated by numeral 82 in FIG. 2(*e*).

The core memory control circuit 21 further comprises address latching means for stabilizing or maintaining, prior to each first part 108 of the core memory cycle, the RAM address signals received from the address bus 22 during the second time interval 81 next preceding the first part 108 of the core memory cycle. As noted earlier, the RAM address register 47 provides RAM address signals on the address bus 22 only during the second time intervals 81. However, since the magnetic core memory 19 has a two-part memory cycle for sequential reading and writing operations, the address signals must be uninterruptedly provided to the magnetic core RAM 19 for the duration of the first and second parts 108 and 109 of the core memory cycle.

With reference to FIG. 3, each one of the ten bit address lines (connecting the address bus to the core memory control circuit 21, as shown in FIG. 1) is connected to a level shifter 123 (similar to the previously described voltage level shifters) which in turn is connected to the data terminal of an electronic latch 124 through a line 126, the output terminal of this latch being connected to one bit of the ADDRESS(TTL) lines 66. For purpose of simplification, only the address latching means for one address bit is illustrated. Latch 124 is controlled by the READ(TTL) signal on interconnecting line 94 connected to its clock terminal, a positive-going transition of the READ(TTL) signal, shown in FIG. 2(*f*) by reference numeral 91, during the second time interval 81 next preceding the first part 108 of the core memory cycle being operable to control this latch to provide a 1 logic state or a 0 logic state for the duration of the core memory cycle in accordance with the high or low conditions of its associated address line 28, respectively. As shown in FIG. 2(*j*), the ADDRESS(TTL) signal can assume a transition, illustrated by reference numeral 127, only during the second time interval 81 next preceding the first part 108 of the core memory cycle, the ADDRESS(TTL) signal assuming a 1 logic state, illustrated by numeral 129, or a 0 logic state, illustrated by numeral 131, for the duration of the core memory cycle.

The core memory control circuit 21 further comprises data latching means for stabilizing or maintaining prior to, and for the duration of, each second part 109 of the core memory cycle, the input data signals received from the instruction and data bus 23 during the first time interval 79 next preceding the second part of the core memory cycle. With reference to FIG. 3, each bit of the four bit data input lines 36 is connected to a level shifter 132, the output thereof being connected to the data terminal of an electronic latch 133 through a line 134. Again, only the circuitry for one input data bit is shown in that figure for simplification. The output of latch 133 is connected to one bit of the DATA IN(TTL) lines 67, this latch being controlled by the $\overline{\text{READ(TTL)}}$ signal connected to its clock input by means of interconnecting line 96. The operation of the latch 133 is similar to that of the latch 124, a positive-going transition of the $\overline{\text{READ(TTL)}}$ signal connected to the clock terminal of latch 133 during the first time interval 79 next preceding each second part 109 of a core memory cycle being operable to control that latch to provide and maintain at the input to the core RAM 19 and the DATA IN(TTL) signal on one of the lines 67 for the duration of the second part 109 of the core memory cycle, during which core RAM writing operations can occur. With reference to FIG. 2(*k*), the DATA IN(TTL) signal can assume a transition, illustrated by reference numeral 136, only during the first time interval 79 next preceding the second part 109 of the core memory cycle, the DATA IN(TTL) signal assuming either a 1 logic state, illustrated by numeral 137, or a 0 logic state, illustrated by 138, during the second part 109 of the core memory cycle.

The core memory control circuit 21 comprises data output means for presenting output data signals retrieved from the core memory 19 to the instruction and data bus 23, through four bit lines 36 during each first time interval 79. The data output means also comprises means for floating its output, or presenting a very high impedance, during each second time interval 81 during which, as noted earlier, the instruction and data bus 23 carries either instructions from the program ROM 12 to the CPU 10 or data from the ROM to the I/O circuits, the high impedance preventing interference with the signals on that bus.

With reference to FIG. 2(l), the DATA OUT(TTL) signals on each bit of the four bit lines 68 assume either a 1 or a 0 logic state, as illustrated by numerals 139 and 141, respectively, following the core access time interval, designated by reference numeral 142, during which the magnetic core RAM 19 is read. The core access time commences upon the high to low transition of the CLOCK B(TTL) signal designated by reference numeral 103 in FIG. 2(*g*). As shown in FIG. 2(m), the core memory control circuit 21 provides DATA OUT(-MOS) signals on each of the 4 bit lines 36 connecting the core memory control circuit to the instruction and data bus 23 to provide output data at MOS levels during the first time interval 79 in accordance with the DATA OUT(TTL) signals shown in FIG. 2(*l*), the DATA OUT(MOS) signals assuming voltage levels of 0 and −17 volts designated by reference numerals 143 and 144, respectively, in FIG. 2(*m*).

With reference to FIG. 3, each bit of four bit lines 68 carrying DATA OUT(TTL) signals is connected to first gating means comprising conventional electronic AND gates 146 and 147, the latter connected through an inverter 148, for gating those DATA OUT(TTL) signals with a strobe signal provided at the output of a latch 149 on a line 151 during each first time interval 79. The electronic logic circuitry for only one output data bit is illustrated for simplification, and it will be recognized that suitable equivalent electronic gating means may be substituted for the illustrated gating devices. Latch 149 is controlled by the READ(TTL) signal on line 94 connected to its data input terminal, and the CLOCK B (TTL) signal on line 102 connected to both its clock and clear terminals. Latch 149 is operable to provide a strobe signal on line 151 which assumes a 1 logic state during each first time interval 79, the strobe signal remaining at logic state 0 at all other times. Latch 149, functioning similar to the other electronic latches contained within the core memory control circuit 21, provides a 0 logic state at its output terminal when the CLOCK B (TTL) signal on its clear terminal is at a 0 logic state or condition during the first half of the first part 108 and the first half of the second part 109 of the core memory cycle, as shown in FIG. 2(*g*). When the clear terminal is at a 1 logic condition, a positive-going transition on the clock terminal, also connected to the CLOCK B (TTL) signal, triggers or controls latch 149 to provide at its output terminal the logic condition then supplied to its input. With reference to FIG. 2(*f*), the READ (TTL) signal is at a 1 logic condition during the first part 108 of the core memory cycle. The positive-going transition of the CLOCK B (TTL) signal occurring during the first part 108 of the core memory cycle, designated by numeral 104 in FIG. 2(*g*), serves to latch the 1 logic state of the READ (TTL) signal then supplied to the input terminal of latch 149. It will be noted from FIGS. 2(*f*) and (*g*) that both the READ (TTL) and CLOCK B (TTL) signals are at 1 logic states during each first time interval 79.

The data output means further comprises second gating means comprising conventional NAND gates 152 and 153 drivingly coupled to the gate terminals of conventional P-channel enhancement type metal oxide semiconductor field-effect transistors (MOSFETs) or other electronic switching means 154 and 156, respectively, the output terminals of these transistors being connected to one bit of the four bit lines 36, the latter being in turn connected to the instruction and data bus 23. One input of each of NAND gates 152 and 153 is connected by means of a line 157 to the output terminal of an inverter 158 having its input connected to the cycle disable line 118. The other input to NAND gate 152 is connected to an OR gate 159 through a line 161, this OR gate having one input thereof connected to the output of AND gate 146 through a line 162, and its other input connected to the CLOCK B(TTL) signal on line 102 through a line 163 and an inverter 164. The other input of NAND gate 153 is connected to the output of NAND gate 147 by means of a line 166. The source (S) terminal of MOSFET 154 is connected to ground, and its drain (D) terminal is connected to the source terminal of MOSFET 156 and to one bit of the four bit line 36. The drain terminal of MOSFET 156 is connected to $V_{DD}$ (−17 volts). The substrate (SUB) terminals of MOSFETs 154 and 156 are interconnected together, and also to the ground line connected to the source of MOSFET 154. Each of the MOSFETs 154 and 156 function as a simple switch in a known manner to provide an open circuit between its source and drain terminals if the voltage on its gate equals the voltage on its source (0 volts or ground potential), and a closed circuit between its source and drain terminals if its gate voltage decreases below its threshold voltage.

In response to a 1 logic state on the cycle disable line 118 occurring for each memory cycle during which I/O selection occurs (as previously described), inverter 158 provides a 0 logic state or condition to one input of each of NAND gates 152 and 153 by means of line 157, thereby causing the outputs of those NAND gates to assume a 1 logic state in a well-known manner. This 1 logic condition (0 volts) at each of the outputs of NAND gates 152 and 153 causes an open circuit to be provided between the source and drain terminals of MOSFETs 154 and 156, thereby floating or isolating one bit of lines 36.

Conversely, assuming RAM instead of I/O selection, line 157 assumes a 1 logic state. The OR gate 159 is operable to provide at its output on line 161 a 1 condition during the alternate time intervals between the first time intervals 79 and the second time intervals 81 to cause NAND gate 152 to assume a 0 logic condition (−5 volts) at its output to switchingly close MOSFET 154, thereby connecting its drain terminal to ground potential; the CLOCK B (TTL) signal on line 102, illustrated in FIG. 2(*g*), provides a 1 logic state on line 163 at the intput of OR gate 159 during those alternate time intervals after being inverted by inverter 164.

During the second time intervals 81 during which the output of latch 149 on line 151 is at a O logic condition, the outputs of AND gates 146 and 147 on lines 162 and 166 cause NAND gates 152 and 153, respectively, to provide 1 logic conditions at their outputs connected to the gates of the MOSFETs 154 and 156 to maintain the latter in open operating conditions, thereby floating the DATA OUT (MOS) output on one bit of lines 36, in a manner similar to that described earlier.

During the first time intervals 79, latch 149 provides at one input to each of AND gates 146 and 147 a 1 logic condition to enable presentation of the DATA OUT(TTL) signal on one bit of lines 68 to the instruction and data bus 23 by means of one bit of lines 36. When one bit of lines 68 is at a 1 logic condition, AND gate 146 provides a 1 logic state at its output, AND gate 147 simultaneously providing a O logic condition at its output due to the operation of inverter 148. Assuming that the cycle disable line 118 is at a O logic state corresponding to RAM (as opposed to I/O) selection, the output of NAND gate 152 and NAND gate 153 will assume O and 1 logic conditions, respectively, thereby causing MOSFET 154 to close and MOSFET 156 to open, in order to supply O voltage on one bit of lines 36. Conversely, when the DATA OUT(TTL) signal on one bit of lines 68 assumes a O logic condition, the outputs of AND gates 146 and 147 will be reversed from the just described situation, thereby providing 1 and O logic conditions at the outputs of NAND gates 152 and 153, respectively, causing MOSFET 154 to open and MOSFET 156 to close, thereby providing −17 volts from the drain terminal of MOSFET 156 to one bit of lines 36.

It should be noted that the voltage levels and logic conditions illustrated in the core memory control circuit 21 correspond to those conveniently utilized in the preferred working embodiment of the present invention, but the core memory control circuit 21 is not restricted to the use of the disclosed voltages and logic conditions, their selection being a matter of design choice. For example, the level shifters 87, 98, 111, 123 and 132 are operable to transform the indicated MOS voltage levels of 0 and −17 volts to the TTL voltage levels of 0 and −5 volts; however, any suitable voltages can be utilized, and the level shifters can be omitted from the core memory control circuit 21 if the voltage levels are compatible.

Figure 4:
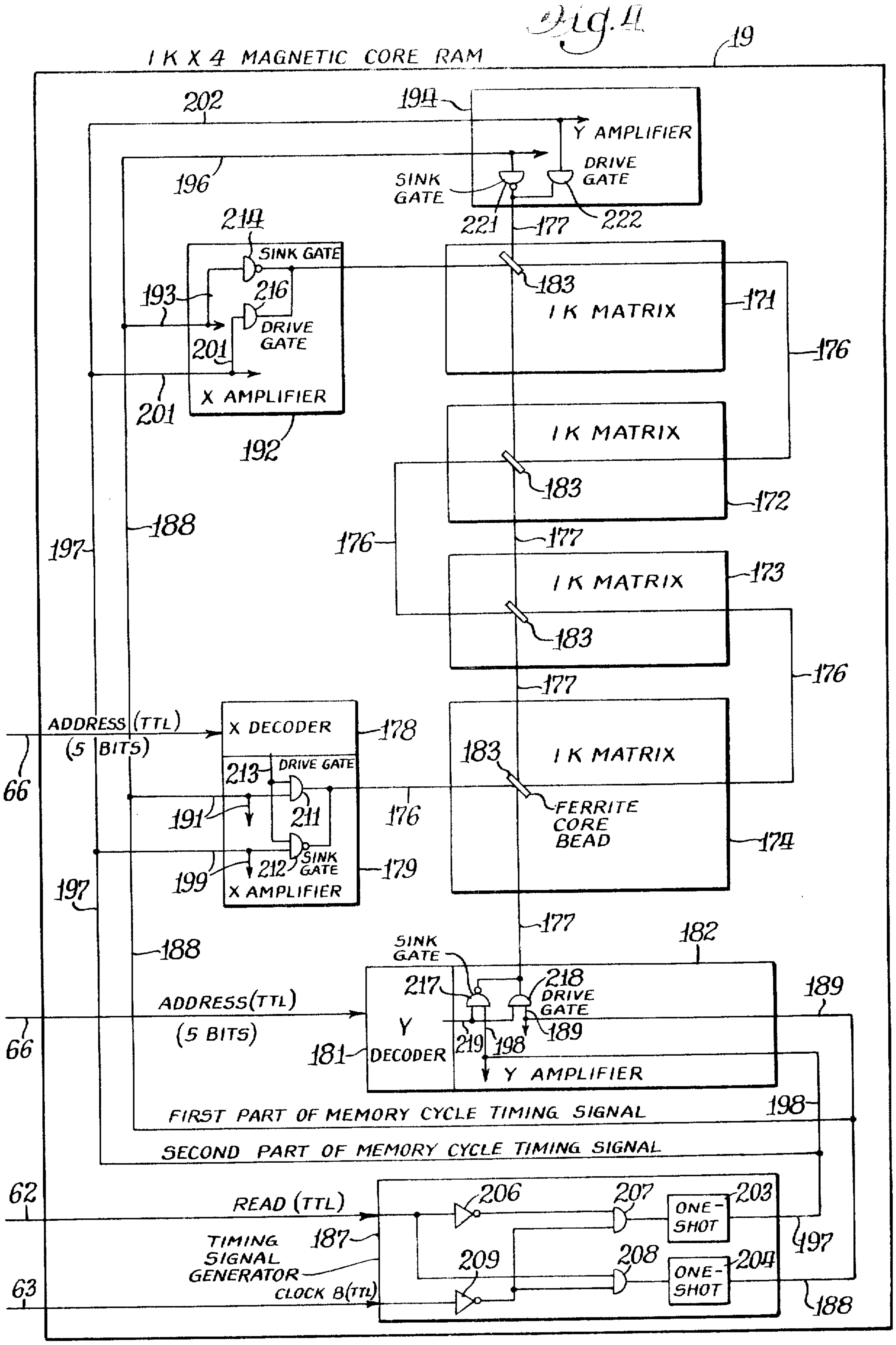
FIGS. 4 and 5 are simplified schematic diagrams illustrating some of the features of a known magnetic core RAM suitable for use with the core memory control circuit means of the present invention.
Figure 5:
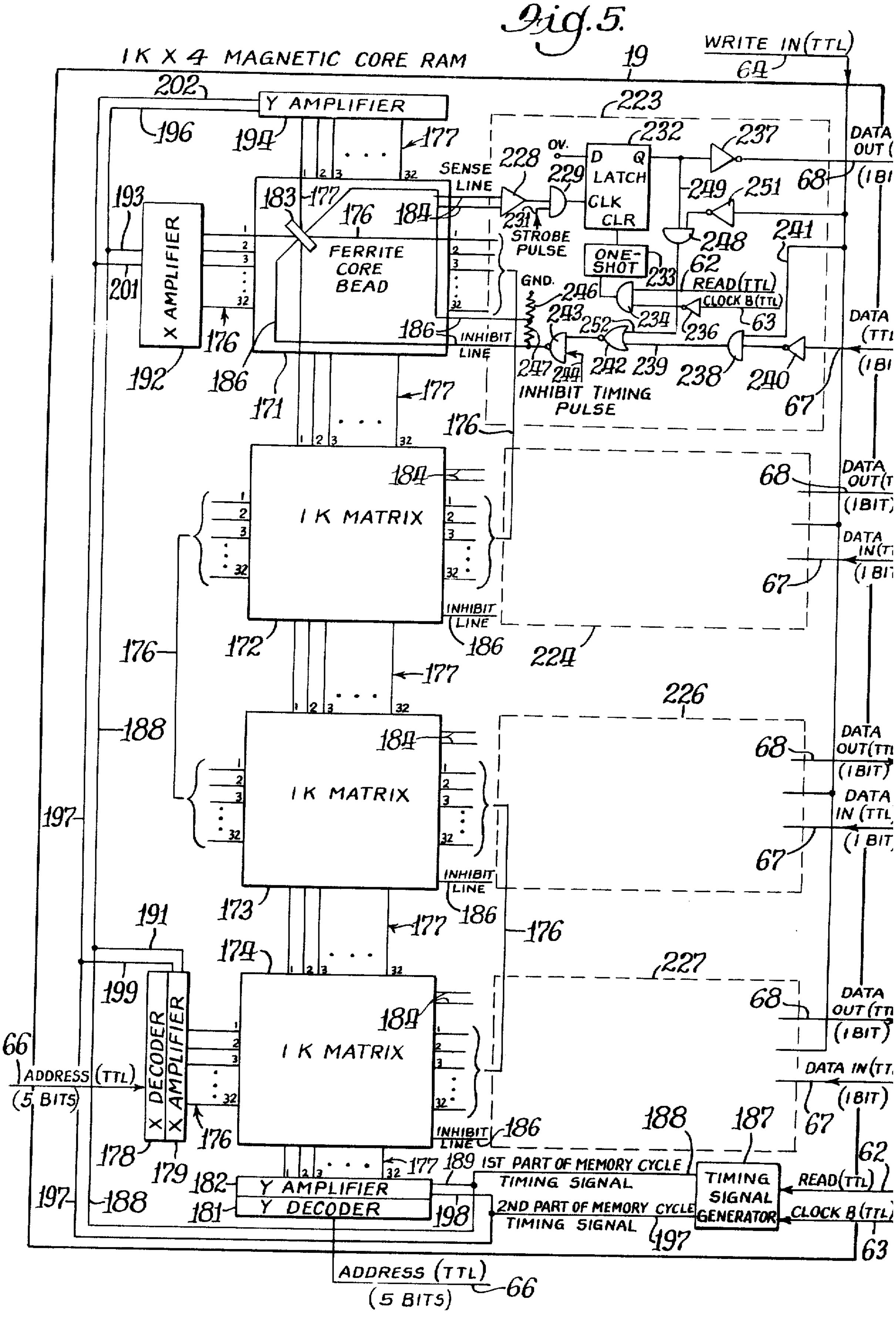

FIGS. 4 and 5 are simplified diagrams illustrating some of the features of a known magnetic core RAM 19 suitable for use with the core memory control circuit 21 of the present invention. The illustrated and described RAM comprises a known four-wire destructively read non-volatile magnetic core RAM having a two part memory cycle for sequential reading and writing operations; of course, various types and sizes of magnetic core RAMs can be utilized with the present invention.

As shown in FIGS. 4 and 5, the magnetic core RAM 19 comprises a conventional 1 K X 4 device having four matrices 171, 172, 173 and 174, each matrix having 1,024 address locations accessed by 32 address lines 176 arranged in zig-zag fashion through the four matrices, and 32 address lines 177, only one X and Y address line being illustrated in FIG. 4 for simplification. Five bits of the ten bit ADDRESS (TTL) lines 66 are connected to an X decoder 178 and an X amplifier 179, the remaining 5 bits being connected to a Y decoder 181 and a Y amplifier 182. The X decoder 178 comprises a diode logic matrix, which is in turn connected to the X amplifier 179, both devices being cooperable to decode and amplify five bits of the ADDRESS (TTL) signals on lines 66 to provide individual energization of one of the X lines 176 in a known manner. Similarly, the Y decoder 181 and its associated Y amplifier 182 are cooperable to decode and amplify the other five bits of the ADDRESS (TTL) signals on lines 66 to provide individual energization of the Y address lines 177. At the intersection of each X address line 176 and Y address line 177, a ferrite core bead 182 is provided for variable data signal storage, the data information residing in the direction of alignment of the magnetic domains of each bead in a well-known manner. In order to write information into a core bead 183 in each of the four matrices 171, 172, 173 and 174, one-half of the current necessary to switch or alter the direction of alignment of the magnetic domains of each of those four beads is supplied to one X address line 176 and one Y address line 177, both of these lines being wired through the centers of those four beads, the aiding full-current coincidence of these one-half currents at each of those beads being operable to switch its domains in a particular direction (if not in that direction already), in a well-known manner.

As noted earlier, the magnetic core RAM is destructively read during the first part 108 of the magnetic core cycle. In order to read a given address location in each of the four matrices 171, 172, 173 and 174, one X address line 176 and one Y address line 177 for the selected address location are simultaneously provided with one-half currents in given directions, a sense line 184 (FIG. 5) being wired through all of the beads in an associated matrix, whereby alteration of the direction of alignment of the magnetic domains in each addressed bead by these reading one-half currents produces a current causing a predetermined voltage on its associated sense line in a known manner. Conversely, if the reading one-half currents do not switch each addressed bead, a much smaller voltage is produced on its associated sense line. During the second part 109 of the core memory cycle, the one-half currents through the addressed bead 183 in each matrix are reversed, an inhibit line 186 (FIG. 5) being wired through all of the beads in an associated matrix to selectively provide a one-half current during certain of the second parts 109 in an opposing direction to the direction of the reversed one-half currents to inhibit the effectiveness of the latter in reversely switching the direction of alignment of the destructively read magnetic domains of the accessed bead, in a known manner.

In order to control the directions of the one-half currents on the X and Y address lines 176 and 177 for cyclical reversal, the memory cycle timing signal means of the core memory control circuit 21 is operable to control a timing signal generator 187 (FIGS. 4 and 5) to provide timing pulse signals at the beginnings of the first and second part 108 and 109 of the core memory cycles. As shown in those figures, the timing signal generator 187 is connected to the READ(TTL) signal on line 62, and the CLOCK B(TTL) signal on line 63. The timing signal generator 187 is operable to provide a timing pulse signal at the beginning of the first part 108 of each memory cycle on a line 188 in turn connected to the Y amplifier 182 through a line 189, to the X amplifier 179 through a line 191, to an X amplifier 192 through a line 193, and to a Y amplifier 194 through a line 196. Similarly, the timing signal generator 187 is operable to provide a timing pulse signal at the beginning of the second part 109 of each core memory cycle on a line 197 in turn connected to the Y amplifier 182 through a line 198, to the X amplifier 179 through a line 199, to the X amplifier 192 through a line 201, and to the Y amplifier 194 through a line 202. The timing signal generator 187 comprises two monostable or one-shot multivibrators 203 and 204 of conventional design, and being operable to provide output pulse signals of predetermined durations on lines 197 and 188, respectively.

The READ(TTL) signal on line 62 is connected through an inverter 206 to one input of AND gate 207 having an output thereof connected to the input terminal of multivibrator 203; line 62 is also connected to one input of AND gate 208 having its output connected to the input of multivibrator 204. The CLOCK B(TTL) signal on line 63 is connected to the other inputs to AND gates 207 and 208 through an inverter 209. Each multivibrator 203 and 204 is triggered by a positive-going pulse provided at its input from the output of its associated AND gate. Multivibrator 204 is controlled to provide at its output a pulse at the beginning of the first part 108 of each memory cycle in response to a positive-going or low to high transition occurring at the output of AND gate 208 occurring at the coincidence of the 1 logic state of the READ(TTL) signal and the low to high transition of the inverse of the CLOCK B(TTL) signal. With reference to FIGS. 2(*f*) and (*g*), the positive-going transition at the output of this AND gate occurs simultaneously with the high to low transition of the CLOCK B(TTL) signal designated by numeral 103. Similarly, one-shot multivibrator 203 is controlled to provide a pulse at the beginning of the second part 109 of each core memory cycle by a positive-going transition at the output of AND gate 207 occurring when both the inverse of the READ(TTL) and the inverse of the CLOCKB(TTL) signals are both at a 1 logic state. Again with reference to FIGS. 2(*f*) and (*g* ), these inverse signals both become high simultaneously with the high to low transition of the CLOCK B(TTL) signal designated by numeral 106.

With reference to FIG. 4, the X and Y amplifiers 179, 182, 192 and 194 contain sink and drive gates operable in a known manner to provide one-half currents on the X and Y address lines 176 and 177 in a first direction to switch accessed core beads into a 1 logic state during the first part 108 of each core memory cycle, and in a reversed direction during each second part 109. The X amplifier 179 comprises a drive AND gate 211 and a sink NAND gate 212 having outputs thereof commonly connected to one X address line 176, a total of 32 pair of gates 211 and 212 being provided for the 32 X lines 176. For purpose of simplification, only one such pair is illustrated, and isolating diodes between these pairs have been omitted. One input to each of the drive and sink gates 211 and 212 of a particular pair is connected to the X decoder 178 by means of one of 32 lines 213.

The other input to each of the drive and sink gates 211 and 212 is connected to lines 188 and 197 through lines 191 and 199, respectively. Lines 188 and 197 are also connected to 32 pairs of sink NAND gates 214 and drive AND gates 216 in the X amplifier 192 by means of lines 193 and 201, respectively, the outputs of each pair of gates 214 being commonly connected to one X address line 176 (only one such pair being illustrated).

Similarly, the timing signal generator 187 is connected to a sink NAND gate 217 and a drive AND gate 218 for each Y address line 177 in the Y amplifier 182, the outputs of gates 217 and 218 of a particular pair being commonly connected to one Y line 177. One input to each of the gates 217 and 218 of a particular pair is connected to the Y decoder 181 by means of one of 32 lines 219. The other input to each of the drive gates 218 is connected to line 188 by means of line 189, the other input to each of the sink gates 217 being connected to line 197 by means of line 198. Each Y address line 177 is also connected to the commonly connected outputs of a sink NAND gate 221 and a drive AND gate 222 in the Y amplifier 194 having inputs respectively connected to line 188 through line 196, and line 197 through line 202.

At the beginning of the first part 108 of each memory cycle, one-shot multivibrator 204 provides on line 188 a pulse to one input of all of the drive gates 211 and 218, one drive gate 211 and one drive gate 218 receiving a 1 logic condition from its associated decoder on one of lines 213 and one of lines 219, respectively, to provide one-half currents to one selected core bead 183 in each of the four matrices 171, 172, 173 and 174 through one of the X address lines 176 and one Y address line 177, the other ends of these address lines being respectively connected to one of thirty-two sink gates 214 and one of 32 sink gates 221, also simultaneously energized through line 188. Similarly, during the second part 109 of each memory cycle, one-shot multivibrator 203 provides on line 197 a pulse to one input of all of the sink gates 212 and 217 in the X and Y amplifiers 179 and 182, respectively, one sink gate 212 and one sink gate 217 receiving a 1 logic condition from its associated decoder on one of lines 213 and one of lines 219, respectively. The energized condition on one of lines 213 and one of lines 219 is maintained throughout the entire core memory cycle. With reference to FIG. 2(*j*), and as described earlier, the ADDRESS (TTL) signals supplied to the decoders must be stable or defined prior to the beginning of the first part 108 of the core memory cycle, and must be maintained in that condition for the duration thereof. The X and Y address lines 176 and 177 for the selected core beads 183 are respectively connected to drive gates 216 and 222 in the X and Y amplifiers 192 and 194, also simultaneously energized by the line 197 at the beginning of the second part 109 of each core memory cycle, to provide reversed one-half currents through the selected core beads during each second part.

With reference to FIG. 5, the matrices 171, 172, 173 and 174 of the magnetic core RAM 19 are each connected to identical data latch circuits 223, 224, 226 and 227, respectively, enclosed within the large dotted boxes in that figure, only the details of the data circuit 223 being described to show how the magnetic core RAM 19 utilizes the control signals provided by the core memory control circuit 21, and presents output data to the latter.

Each sense line 184 is threaded through all of the core beads 183 of its associated matrix and is connected to an operational amplifier 228 in its associated data latch circuit typified by circuit 223, the amplifier 228 being operable to provide a 1 logic state or high condition to one input of an AND gate 229 when the voltage on the sense line exceeds the threshold voltage of the amplifier. The other input to AND gate 229 is connected to a strobe pulse produced on line 231 during the first part 108 of each memory cycle, and the presence of a voltage on the sense line occurring in response to the switching of the selected core bead provides a positive-going transition at the output of the AND gate 229 which is connected to the clock terminal of a latch 232, the latter being operable in response to this transition to latch at its output terminal a 1 logic state, since its input terminal is permanently connected to a 1 logic level.

The clear terminal of latch 232 is connected to the output of a one-shot multivibrator 233 having an input thereof connected to the output of an AND gate 234 having inputs connected to the READ (TTL) signal on line 62, and the CLOCK B (TTL) signal on line 63 through an inverter 236. The one-shot 233 is operable to provide a setting or initiating pulse to the clear input of latch 232 at the beginning of the first part 108 of the core memory cycle when the READ (TTL) signal and the inverse of the CLOCK B (TTL) signal are both high, as seen from FIGS. 2(*f*) and (*g*), this setting pulse causing the latch output to assume a O logic condition at the beginning of the core access time interval 142 illustrated in FIG. 2(l). This O logic condition causes the DATA OUT(TTL) signal on one bit of four bit lines 68 to assume a 1 (0 volt) logic condition due to the operation of an inverter 237 connected in that output line.

As noted earlier, the one-half currents on the X and Y address lines 176 and 177 during the first part 108 of the core memory cycle destructively set the selected core bead 183 in each matrix into a 1 logic condition. Thereafter, during the second part 109, this 1 logic condition will be retained in that selected core bead 183 only if the inhibit line 186 is provided with a one-half inhibit current in a direction opposing the reversed one-half currents on the X and Y address lines 176 and 177, thereby inhibiting reversal of the 1 logic condition in the selected core bead. The 1 logic condition in the addressed bead will be retained (that is, its reversal inhibited) during the second part 109 of the core memory cycle under either of two conditions: first, the DATA IN (TTL) signal on one bit of four bit lines 67 requires writing a 1 logic condition into the selected bead; secondly, a 1 logic condition read from the selected core bead 183 during the first part 108 must be maintained. With reference to FIG. 2(k) and as noted earlier, the DATA IN (TTL) signals on each of the four bit lines 67 are stabilized or defined prior to the second part 109 of the core memory cycle and maintained for the duration of the second part to enable a writing operation.

When the DATA IN (TTL) signal on one bit of four bit lines 67 is at a 1 logic condition, and the WRITE (TTL) signal on line 64 is also at a 1 logic condition, the latter being illustrated by reference numeral 119 in FIG. 2(*h*), the output of an AND gate 238 in the typical data circuit 223 (FIG. 5) assumes a O condition on an output line 239, one input of AND gate 238 being connected to one bit of four bit lines 67 through an inverter 240, the other input of AND gate 238 being connected to the WRITE (TTL) line 64 through a line 241. This O logic state or condition on line 239 causes a 1 logic condition at the output of a NOR gate 242 having one input thereof connected to line 239, the output of NOR gate 242 being connected to one input of a NAND gate 243 having another input thereof connected to an inhibit timing pulse line 244. The inhibit timing pulse line 244 is operable in a known manner to provide a control pulse signal to NAND gate 243 to enable the inhibit line to provide a one-half inhibit current during the second part 109 of each core memory cycle in accordance with the other input to NAND gate 243. The 1 logic condition at the output of NOR gate 242 causes the output of NAND gate 243 to assume a O logic state (−5 volts), thereby causing an inhibit one-half current, since the output of NAND gate 243 is applied to one terminal of the inhibit line 186, its other terminal being connected to ground through a resistor 246, and another resistor 247 is provided between the end terminals of the inhibit line. This inhibit current serves to prevent or inhibit reversal of the 1 condition applied to the selected core bead 183 during the first part 108 of the core memory cycle.

Conversely, when the DATA IN (TTL) signal is at a O logic condition, and the WRITE (TTL) signal is at a 1 logic condition, a 1 logic condition (0 volts) is assumed by the output of NAND gate 243, resulting in no inhibit current, and therefore enabling reversal of the 1 logic condition applied to the selected core bead 183 during the first part 108 of the core memory cycle. A O logic condition on one bit of lines 67 causes the output of AND gate 238 to assume a 1 logic state, and NOR gate 242 to assume a O logic state, thereby causing a 1 logic condition at the output of NAND gate 243.

When the WRITE (TTL) signal is at a O logic state during the second part 109 of the core memory cycle, as indicated by reference numeral 121 in FIG. 2(*h*), the data latch circuit 223 is operable to restore during the second part 109 of the core memory cycle the data destructively read from the selected core bead 183 during the first part 108. As noted earlier, the latch 232 provides at its output a 1 logic condition when a predetermined voltage is produced on the sense line 184 in response to switching of the selected core bead 183, the latch 232 providing a O logic state when no switching of the selected core bead had occurred (the cord bead having a 1 logic condition prior to the reading operation). If the core bead state was a O logic condition prior to destructive reading, the data latch circuit 223 is operable to control its associated matrix to restore that O logic condition upon reversal of the one-half currents on the X and Y address lines 176 and 177 for the selected core bead, the inhibit line 186 assuming a 1 logic state (O volts) to be inactive for this procedure. However, should the previous condition be a 1 logic state, the data latch circuit 223 must actuate its inhibit line 186 to provide an inhibit current to prevent the reversing one-half currents to alter that 1 state.

The output of latch 232 (FIG. 5) is connected to one input of an AND gate 248 through a line 249, the other input of AND gate 248 being connected to the WRITE (TTL) line 64 through an inverter 251. The output of AND gate 248 is connected to one input of the NOR gate 242 through a line 252.

When the output of latch 232 is at a 1 logic condition, switching of the selected core bead 183 having occurred, the output of AND gate 248 assumes a 1 logic condition, which results in a O logic condition at the output of NOR gate 242, thereby causing NAND gate 243 to assume a 1 logic condition (to produce no inhibit current), enabling restoration of the O logic state at the selected core bead by the reversed one-half currents.

Conversely, when the output of latch 232 is at a O logic condition, no switching of the selected core bead 183 having occurred, the output of AND gate 248 assumes a O logic condition, which results in a 1 logic condition at the output of NOR gate 242, thereby causing NAND gate 243 to assume a O logic condition (−5 volts) to cause a resultant inhibit current on the inhibit line 186 for preventing reversal of the selected core bead logic state.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form described being merely a preferred embodiment thereof.

We claim:

1. In combination with an electronic digital processing system having an addressable program read-only memory, an addressable volatile semiconductor random access memory, central processing means for obtaining and executing program instruction signals from said read-only memory and for retrieving variable transaction output data signals from and simultaneously entering variable transaction input data signals into said semiconductor random access memory, time-shared address bus means for receiving address signals from said processing means to sequentially and repetitively access preselected address locations in said read-only memory and said random access memory during first and second intersticed time intervals, respectively, time-shared instruction and data bus means connected to said processing means and operable to obtain said instruction signals during said second time intervals, and to retrieve said output data signals and enter said input data signals during said first time intervals, both said address bus means and said instruction and data bus means being cleared of signals during the time intervals between said first and second time intervals, and write command means connecting said processing means with said random access memory for providing write command signals to the latter to enter said input data signals therein during certain of said first time intervals in accordance with said instruction signals; wherein the improvement comprises core memory control circuit means for compatibly connecting said address bus means, said instruction and data bus means and said write command means with a non-volatile magnetic core random access memory having repetitive memory cycles each initiated after a said second time interval and comprising first and second parts, output data signals being retrieved from said core memory during said first parts and input data signals being entered into said core memory during said second parts, said core memory control circuit means comprising: memory cycle timing signal means for repetitively initiating each said memory cycle and sequentially determining said first and second parts thereof, core memory write signal means for controlling said core memory to enter said input data signals therein during certain of said second parts in response to said write command signals, address latching means for stabilizing prior to each said first part said random access memory address signals received from said address bus means during the said second time interval next preceding said first part, data latching means for stabilizing prior to each said second part said input data signals received from said instruction and data bus means during the said first time interval next preceding said second part, and data output means for presenting at the output thereof said output data signals retrieved from said core memory said instruction and data bus means during each said first time interval and for floating said output during each said second time interval, whereby said core memory control circuit means renders said sequentially read and written magnetic core random access memory interchangeable with said simultaneously read and written semiconductor random access memory.

2. The core memory control circuit means of claim 1, wherein said processing system is controlled for time-shared operation of said bus means by first and second synchronized and phased clock signals, said second signal being of twice the frequency of said first signal; two monostable multivibrators, said memory cycle timing signal means providing signals derived from both said clock signals to control said multivibrators to provide timing pulse signals at the beginnings of said first and second parts of said memory cycles.

3. The core memory control circuit means of claim 1, wherein said processing system is controlled for time-shared operation of said bus means by first and second synchronized and phased clock signals, said second signal being of twice the frequency of said first signal; said address latching means comprising an electronic latch for said address signals controlled by a signal derived from said first clock signal.

4. The core memory control circuit means of claim 1, wherein said processing system is controlled for time-shared operation of said bus means by first and second synchronized and phased clock signals, said second signal being of twice the frequency of said first signal; said data latching means comprising an electronic latch for said input data signals controlled by a signal derived from said first clock signal.

5. The core memory control circuit means of claim 1, wherein said central processing unit is operable to select input-output circuits instead of said semiconductor random access memory for interchange of data signals during certain of said first time intervals in accordance with said instruction signals, said write command means being additionally operable to provide an input-output selection signal during the said second time interval next preceding each of said certain first time intervals, and wherein said processing system is controlled for time-shared operation of said bus means by first and second synchronized and phased clock signals, said second signal being of twice the frequency of said first signal; said core memory write signal means comprising first and second electronic latches controlled by signals derived from said first clock signal and said write command signals, said first latch being operable to provide memory cycle disable signals in response to said input-output selection signals, and said second latch being operable to provide write signals to said core memory during said certain second parts in response to said write command signals.

6. The core memory control circuit means of claim 5, wherein said data output means comprises first gating means for gating said output data signals retrieved from said core memory with a strobe signal produced during each said first time interval by an electronic latch controlled by signals derived from said clock signals, and second gating means for gating the output of said first gating means with said memory cycle disable signals for floating said output of said data output means during each memory cycle during which input-output selection occurs.

7. The core memory control circuit means of claim 6, wherein said second gating means are drivingly coupled to the gates of metal oxide semiconductor field-effect transistors, the output terminals of said transistors being connected to said instruction and data bus means.

* * * * *

UNITED STATES PATENT OFFICE

CERTIFICATE OF CORRECTION

PATENT NO. : 3,906,453

DATED : September 16, 1975

INVENTOR(S) : Bruno A. Mattedi and Jitendra G. Nemivant

It is certified that error appears in the above-identified patent and that said Letters Patent are hereby corrected as shown below:

Title page [54] "CARE" should be --CORE--.

Col. 1, line 1, "CARE" should be --CORE--.

Col. 1, line 16, "randon" should be --random--.

Col. 8, line 17, "a" should be --at--.

Col. 16, line 61, "pair" should be --pairs--.

Signed and Sealed this

*ninth* Day of *December 1975*

[SEAL]

*Attest:*

RUTH C. MASON
*Attesting Officer*

C. MARSHALL DANN
*Commissioner of Patents and Trademarks*